US011970376B2

(12) United States Patent
Caldwell et al.

(10) Patent No.: US 11,970,376 B2
(45) Date of Patent: Apr. 30, 2024

(54) WINCH SPEED COMPENSATION SYSTEMS AND METHODS

(71) Applicant: Caterpillar Inc., Peoria, IL (US)

(72) Inventors: Curtis J. Caldwell, Metamora, IL (US); Benjamin Barbier, Grenoble (FR)

(73) Assignee: Caterpillar Inc., Peoria, IL (US)

( * ) Notice: Subject to any disclaimer, the term of this patent is extended or adjusted under 35 U.S.C. 154(b) by 403 days.

(21) Appl. No.: 17/486,275

(22) Filed: Sep. 27, 2021

(65) Prior Publication Data

US 2023/0101055 A1 Mar. 30, 2023

(51) Int. Cl.

*B66D 1/40* (2006.01)
*B66D 1/48* (2006.01)
*B66D 1/08* (2006.01)
*B66D 1/12* (2006.01)

(52) U.S. Cl.

CPC ................ *B66D 1/485* (2013.01); *B66D 1/08* (2013.01); *B66D 1/12* (2013.01)

(58) Field of Classification Search

CPC .. B66D 1/485; B66D 1/08; B66D 1/12; B66C 23/44

See application file for complete search history.

(56) References Cited

U.S. PATENT DOCUMENTS

2005/0072965 A1* 4/2005 Sanders .................. B66D 1/54 254/361
2016/0096709 A1* 4/2016 Averill .................... B66D 1/12 318/6
2016/0318740 A1* 11/2016 Kos ........................ B66D 1/58
2020/0189890 A1 6/2020 Kieser et al.

FOREIGN PATENT DOCUMENTS

CN 203382434 U 1/2014
CN 204057820 U * 12/2014
CN 103395712 B 2/2016
CN 108116623 B 8/2019
GB 891145 3/1962

* cited by examiner

*Primary Examiner* — Emmanuel M Marcelo
(74) *Attorney, Agent, or Firm* — Leydig, Voit & Mayer, Ltd

(57) ABSTRACT

A system for controlling a winch assembly includes a rotatable winch drum with an attached cable. A winch motor is configured to rotate the winch drum. A sensor is configured to generate signals indicative of the number of layers of the winch cable on the winch drum. A winch controller is configured to receive a control input requesting a selected rotation of the winch drum, receive the signals from the sensor, determine a number of layers of the winch cable disposed on the winch drum, and generate control commands to control the winch motor to rotate the winch drum based on the control input and the number of layers of the winch cable. The control command rotates the winch drum to produce a substantially constant line speed based on the selected control input independent of the number of layers determined to be disposed on the winch drum.

20 Claims, 5 Drawing Sheets

WINCH SPEED COMPENSATION SYSTEMS AND METHODS

TECHNICAL FIELD

The present disclosure relates to winches on machines and, more particularly, to systems and methods for maintaining a desired line speed generated by a winch.

BACKGROUND

Winches are used to perform a variety of tasks and therefore are used in a variety of machines. For example, machines such as bulldozers have evolved to include winches to perform tasks in addition to those related to their original earth-moving design. Other machines, such as pipelayers, are designed to use a winch as the primary tool to accomplish work tasks. These tasks often require the winch cable to be reeled in or reeled out in a controlled manner to permit an operator to perform a desired task.

Mechanical winch assemblies are often difficult or challenging to control because the rate of cable pull or line/hook speed is influenced by the number of layers of cable or rope on the drum. It will be appreciated, for example, that as more layers of cable are reeved onto a winch drum, at a given rotational speed of the drum, the line speed of cable retrieved onto the drum increases because the effective combined diameter of the drum and cable increases. The change in line speed from a first number of layers of cable to a second number of layers of cable changes as a function of the diameter of the cable and, in addition, the arrangement of the cable layers stacked on the winch drum.

In particular, some tasks require careful control of the line speed of the winch rope or cable which is complicated by the change of diameter of the coil of rope on the winch drum as the rope is reeved onto or off of a winch drum. It is therefore necessary for the operator of the winch to manually regulate the speed input command to the winch. Depending on the experience of the operator, it can be a challenge to operate the machine and the winch so as to successfully complete a task being performed.

Chinese Patent No. 103395712(B) discusses an output-characteristic-adjustable hydraulic capstan electrohydraulic control system wherein the linear speed of the winch rope is increased or decreased to fall under a pre-determined range to compensate the change in the diameter of the coil by keeping the pulling force constant. It is believed that the measurement of pulling force does not necessarily correspond to reliable regulation of winch line speed.

There is a demand for reliable systems and methods for compensating for changes in line speed due to the number of layers of rope on a winch drum. The present disclosure addresses the demand.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, the disclosure includes a system for controlling a winch assembly including a rotatable winch drum with an attached cable. A winch motor is configured to rotate the winch drum. A sensor is configured to generate signals indicative of the number of layers of the winch cable on the winch drum. A winch controller is configured to receive a control input requesting a selected rotation of the winch drum, receive the signals from the sensor, determine a number of layers of the winch cable disposed on the winch drum, and generate at least one control command to control the winch motor to rotate the winch drum based on the control input and the number of layers of the winch cable. The control command rotates the winch drum to produce a substantially constant line speed based on the selected control input independent of the number of layers determined to be disposed on the winch drum.

In another aspect, the disclosure includes a machine that includes a machine chassis and a winch system including a winch drum configured to rotate, a winch motor configured to rotate the winch drum, a winch cable attached to the winch drum, a sensor configured to generate signals indicative of the number of layers of the winch cable on the winch drum, and a hook attached to the winch cable for coupling to a load. A control system includes a controller configured to receive the signals from the sensor, determine the number of layers of the winch cable that are disposed on the winch drum based on said signals, and generate at least one control command to control the winch motor. The winch drum is thereby rotated based on at least the determination of the number of layers of the winch cable, wherein the at least one control command causes the winch drum to rotate to produce a substantially constant line speed independent of the number of layers determined to be disposed on the winch drum.

Yet another aspect of the disclosure includes a method of operating a winch system of a machine. The method includes receiving, with a controller, a control input; receiving, with the controller, signals indicative of a number of layers of cable on a winch drum of a winch of the winch system; determining, with the controller, the number of layers of cable on the drum based on receiving of the signals; generating at least one control command based on at least the receiving of the control input and the determining of the number of layers; and rotating the drum based on the at least one control command so as to produce a substantially constant line speed independent of the number of layers determined to be disposed on the winch drum.

DETAILED DESCRIPTION

Figure 1:
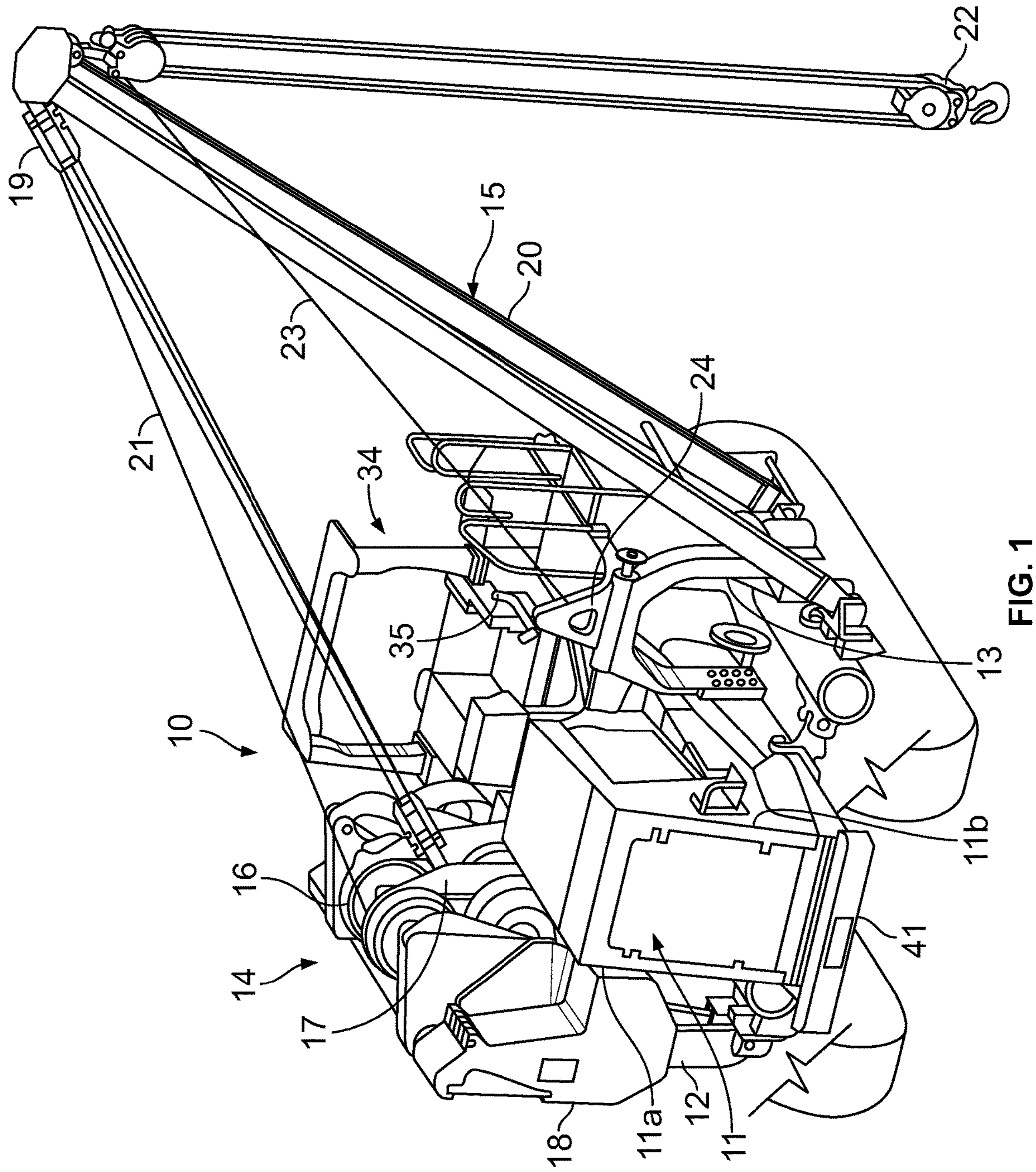
FIG. 1 is a perspective view of a machine including a winch system constructed according to principles of the disclosure.

Now referring to the drawings, wherein like elements refer to like reference numbers, there is illustrated in FIG. 1 an exemplary embodiment of a machine 10 constructed according to principles of the present disclosure which includes a system for compensating line speed of a winch system. In the illustrated embodiment, the machine 10 is a pipelayer. Although the present disclosure is illustrated for a pipelayer, it should be appreciated that the present disclosure contemplates any work machine that includes at least one winch.

The pipelayer 10 includes a work machine chassis 11 including a first side 11*a* and a second side 11*b*. The chassis 11 may be a standard pipelayer chassis 11. A first sub-frame, for example a counterweight frame 12, is attached to the first side 11*a* of the chassis 11, and a second sub frame, for example a boom frame 13, is attached to a second side 11*b* of the chassis 11. A conventional boom assembly 15 of the type known in the art is attached to the boom frame 13, and a counterweight 18 and a winch assembly 14 of the type known in the art is attached to the counterweight frame 12.

The winch assembly 14 may include a boom winch 16, and a load winch 17. The boom winch 16 is coupled to a boom block 19 of a boom 20 via a boom cable 21 such that rotation of the boom winch 16 in one direction causes the boom 20 to lower and rotation in the other direction causes the boom 20 to raise. Similarly, the load winch 17 is coupled to a load hook block and hook assembly 22 via a load cable 23 that is routed around a load sheave 24 such that the rotation of the load winch 17 in one direction causes the load hook block and load hook to lower and rotation in the other direction causes the load hook block to be raised. For purposes of this disclosure, the terms rope and cable will be used interchangeably. Thus, the boom and load winches 16 and 17 are used to lift, position and lower a load, such as a pipe, attached to the load hook of the load hook block and hook assembly 22. Other configurations and numbers of elements related to the boom winch 16 and/or load winch 17 are contemplated. It should also be appreciated that the counterweight 18 is movable to compensate for the position of the boom and the load on the boom 20. A bumper 41 of the type known in the art used specifically for pipelayers is attached to a front of the chassis 11.

The machine 10 includes a cab 34 (for clarity, only a portion of cab 34 is shown in FIG. 1) that an operator may physically occupy and provide input to control the machine. The cab 34 may include one or more input devices such as a joystick 35, or any suitable control input mechanism or element, through which the operator may issue operating commands or control requests to control at least one of the propulsion system and steering system of the machine as well as to operate various implements associated with the machine including the winches 16 and 17. In particular, the input device 35 is used by an operator to control the speed and direction of the load winch 17 and generates signals corresponding to the operator inputs to that end. Further, the input device 35 may include features so as to provide the operator the option of selecting different control maps or the like to adapt the operation of the load winch 17 to different diameter cables. Typically, however, winches on pipelayers are typically used with only one diameter of cable, the size and material of which is specified according to a given set of operational parameters based on the tasks expected to be performed by the winch. Other machines, such as those used for towing, for example, are designed to use various cable sizes.

Figure 2:
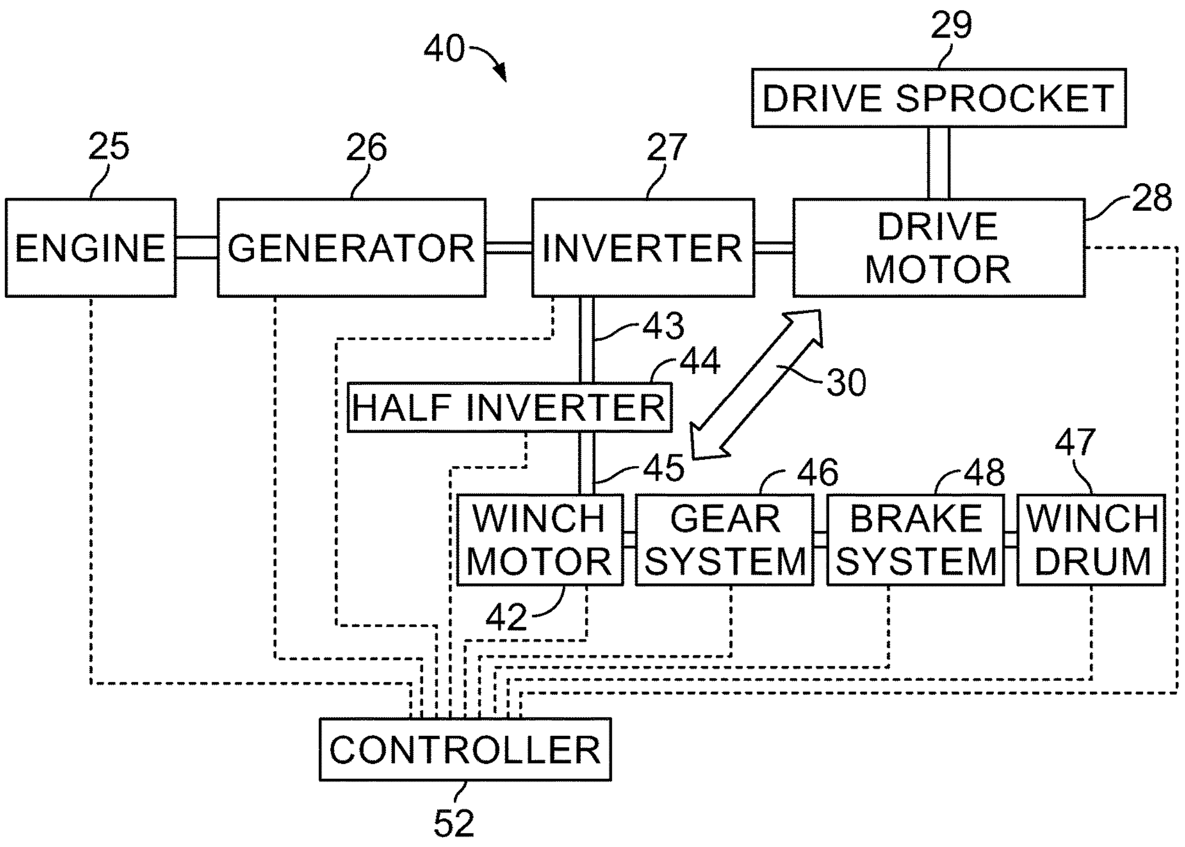
FIG. 2 is a schematic diagram of an embodiment of a winch control system.

The machine 10, referring also to FIG. 2, includes a winch system 40 that operates to reel in and reel out the load cable 23. The winch system 40 is powered by a power source 25, such as an internal combustion engine, or any other suitable source of power. The machine 10, in embodiments, may include a generator 26 operatively connected to the power source 25 by a drive shaft, transmission, belt, chain, pump, or any suitable power transfer mechanism. The generator 26 converts power from the power source 25, such as torque when the power source rotates in operation, into electrical power such as AC current. An inverter 27 is electrically connected to the generator 26 and a drive motor 28 is electrically connected to the inverter 27. The drive motor 28 is configured to propel the machine 10 via one or more sprockets 29 (which may cooperate with ground engaging structure such as wheels or endless treads). The inverter 27 is configured to convert the AC power from the generator 26 into DC power.

The winch system 40 may include a winch motor 42 that is electrically connected to the inverter 27. The winch motor 42 may have any desired configuration. In embodiments, the winch motor 42 may be a switched reluctance motor that operates with AC power. In operation, DC power may be supplied by the inverter 27 through an electrical cable or cable assembly 43 to a second or "half" inverter 44 that converts the DC power to AC power. The AC power is then supplied through cable assembly 45 to drive the winch motor 42. In other embodiments, the inverter 27 may be configured to supply AC power to the winch motor 42 without the half inverter 44. In still other embodiments, the winch motor 42 may be a DC motor and DC power may be supplied by the inverter 27 or through another source on the machine without the half inverter 44. In yet other embodiments, the winch motor 42 is hydraulic or electrohydraulic. While an electrical system is given as an example of one means for operating the winches disclosed herein, it will be understood that hydraulically actuated winches are more typically employed in the operation of pipelayers, as well as other machines designed for use in construction and other settings.

A rotatable winch drum 47 of load winch 17 may be operatively connected to the winch motor 42 by a gear system 46 that is operatively connected to the motor. In embodiments, the gear system 46 may be configured to provide a plurality of rotations of the winch motor 42 for each rotation of the winch drum 47. Rotation of the winch drum 47 may be arrested or prevented by a brake system 48 operatively connected thereto. The gear system 46 and the brake system 48 may have any desired configuration. In embodiments, the gear system 46 and the brake system 48 may be configured with a default condition in which rotation of the winch drum 47 is prevented (i.e., whereby the brake is applied) unless the brake system is disengaged. The winch drum 47 may be configured with the winch load cable 23 wrapped around it a plurality of times. The number of times that the winch cable 23 is wrapped around the winch drum 47 is a function of the size of the drum as well as the length and diameter of the winch cable. Other configurations of the winch system 40 are contemplated.

Figure 3:
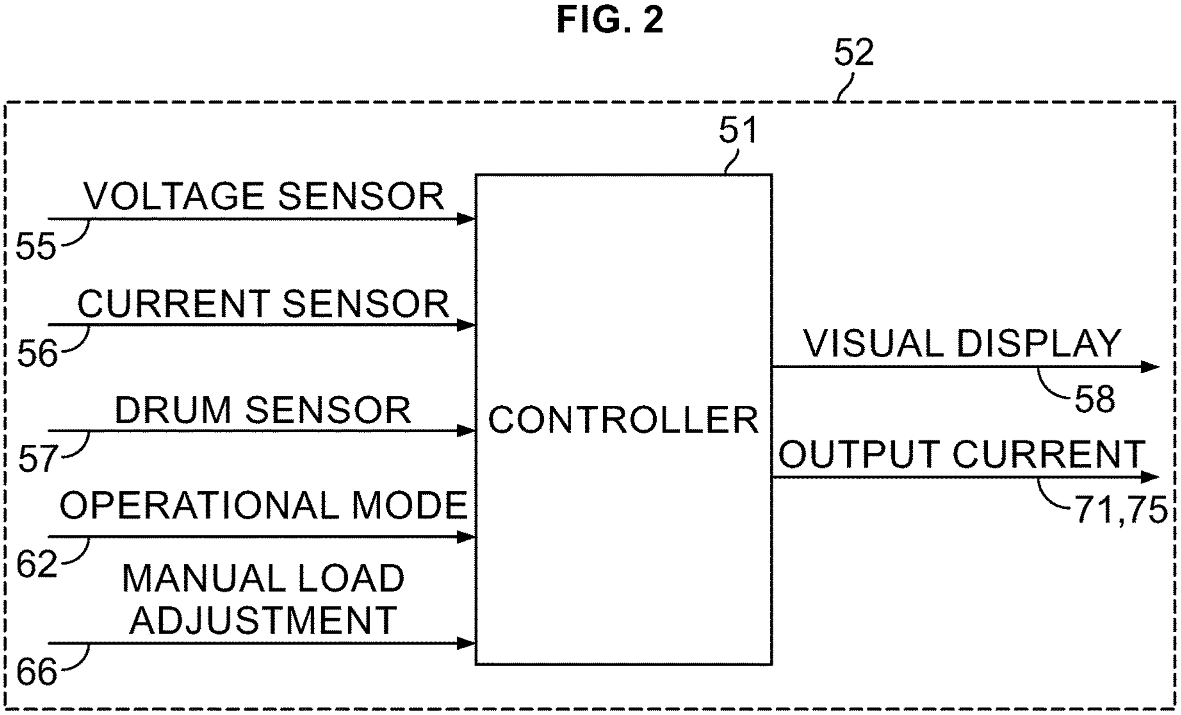
FIG. 3 is a schematic diagram of a controller for a winch control system.

The operation of the engine 25, winch system 40, and other systems and components of the machine 10 are controlled by a winch control system 52 as shown generally in FIG. 2. FIG. 3 shows one schematic example of a controller or control system 52 with a winch controller 51. The control system 52 may receive input signals from an operator operating the machine 10 from within the cab 34 or off-board the machine through a wireless communications system, for example.

The winch controller 51 (FIG. 3) may be any electronic controller that is configured to operate in a logical fashion to perform operations, execute control algorithms, store and retrieve data, and perform other desired operations. The winch controller 51 may include or may access memory, secondary storage devices, processors, and any other components for running at least one application. The memory and secondary storage devices may be in the form of read-only memory (ROM) or random-access memory (RAM) or integrated circuitry that is accessible by the controller. Various other circuits may be associated with the winch controller 51 such as power supply circuitry, signal conditioning circuitry, driver circuitry, and other types of circuitry.

The winch controller 51 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the winch controller 51 may be implemented in hardware and/or software without regard to the functionality. The winch controller 51 may rely on one or more data maps relating to the operating conditions and the operating environment of the machine that may be stored in the memory of controller. Each of these data maps may include a collection of data in the form of tables, graphs, and/or equations.

The control system 52 and the winch controller 51 may be physically located on the machine 10 and may also include components located remotely from the machine. The functionality of control system 52 may be distributed so that certain functions are performed at machine 10 and other functions are performed remotely.

Referring to FIG. 3, machine 10 may be equipped with a plurality of machine sensors that provide data indicative (directly or indirectly) of various operating parameters of the machine, or operating characteristics of certain components such as the winch motor 42, and/or the operating environment in which the machine is operating. The term "sensor" is meant to be used in its broadest sense to include one or more sensor devices and related components that may be associated with the machine 10 and that may cooperate to sense various functions, operations, and operating characteristics of the machine and/or aspects of the environment in which the machine is operating.

A voltage sensor 55 may be provided to sense the voltage at the winch motor 42 and provide voltage data indicative of the voltage. In an embodiment, the voltage sensor 55 may be part of or within the half inverter 44 and have any desired configuration. If the winch system 40 does not include the half inverter 44, the voltage sensor 55 may be part of or within the inverter 27. Other locations for the voltage sensor and other configurations of voltage sensors are contemplated.

A current sensor 56 may be provided to sense the current provided to the winch motor 42 and provide current data indicative of the current. In an embodiment, the current sensor 56 may be part of or within the half inverter 44 and have any desired configuration. If the winch system 40 does not include the half inverter 44, the current sensor may be part of or within the inverter 27. Other locations for the current sensor and other configurations of current sensors are contemplated.

Inasmuch as the torque provided by the winch motor 42 is a function of the voltage at which the motor is operating and the current provided to the motor, the voltage sensor 55 and the current sensor 56 may define a torque sensor. Accordingly, if the torque provided by the winch motor 42 in a different manner, the necessary current may be determined based upon the torque and the voltage.

A drum sensor 57 may be provided for sensing, directly or indirectly, the rotational position of the winch drum 47 and for providing rotation data indicative of the rotational position. The drum sensor 57 may have any desired configuration such as a rotary encoder mounted on or adjacent either the winch motor 42 or the winch drum 47, a camera for collecting visual information indicating the number of layers of winch cable on the drum, or any suitable device or system that is configured to acquire information indicative of the number of layers of winch cable on the drum and convey that information to the winch controller 51, including radar, LIDAR, and acoustic sensors.

In some instances, it may be desirable to monitor the position of the winch motor 42 rather than the winch drum 47 since the winch system 40 may be configured such that the winch motor rotates a number of times that is unequal to the rotation of the winch drum. The winch controller 51 may monitor, store, and convey rotational data of the winch motor 42 (or winch drum 47) to determine changes in the angular position and the number of rotations of the winch drum 47.

In addition to operating as a rotation position sensor, the drum sensor 57 may also be configured to operate as a rotation identification system that senses whether the winch motor 42, and thus the winch drum 47, is rotating or is stationary. In other embodiments, a separate rotation identification sensor may be provided to determine whether the winch motor 42 and/or the winch drum 47 are rotating.

In embodiments, the drum sensor 57, when configured to sense rotation of the winch drum 47, may be used to generate signals, that when analyzed by the winch controller 51, are indicative of how many rotations the winch drum has rotated and/or how many layers of cable 23 are positioned on the drum. For example, a predetermined number of rotations of the winch drum 47 may be interpreted by the winch controller 51 as a change of the numbers of layers of cable 23 on the drum 47 equal to one layer. For example, when the numbers of layers of cable 23 on the drum 47 is indicated or determined to be zero, a change of thirteen rotations pulling cable onto the drum adds one layer of cable. A further change of 12 rotations adds a second layer of cable, and so on. The winch controller 51 therefore determines the number of layers of cable 23 on the drum 47 based on a count of rotations. When cable 23 is released off of the drum 47, and signals are generated indicating a predetermined number of rotations of the drum, one layer of cable is subtracted from the previously determined number of layers. Responsive to a determination that the number of layers of cable 23 is changed from a previously determined number, the winch controller 51 is programmed to change the control command to the winch motor 42 an amount to maintain a constant or substantially constant line speed of cable 23 as long as the operator input remains unchanged. For the present disclosure, "substantially" will be used to mean within about 10 percent of the relevant target value.

Further aspects of the control system 52 include an input for receiving signal related to the selection of an operational mode 62, which may be in the form of a direction control input or direction request, to reel in or out cable 23 or operation of the boom winch 16 to raise or lower the boom assembly 15. Also, the control system 52 includes an input for receiving signals for manually adjusting the load 66 of the load winch, which may be a speed control input or speed request via the joystick 35 (FIG. 1) to set or adjust the rotational speed of the winch motor 42, for example. Operating parameters of the machine 10 may be presented to an operator via a visual display 58 located in the cab 34 (FIG.

1). Also, the winch controller 51 generates control commands 71 to the boom winch 16 and control commands 75 to the load winch 17 which may include one or both of direction commands and drum rotation speed commands.

Figure 4:
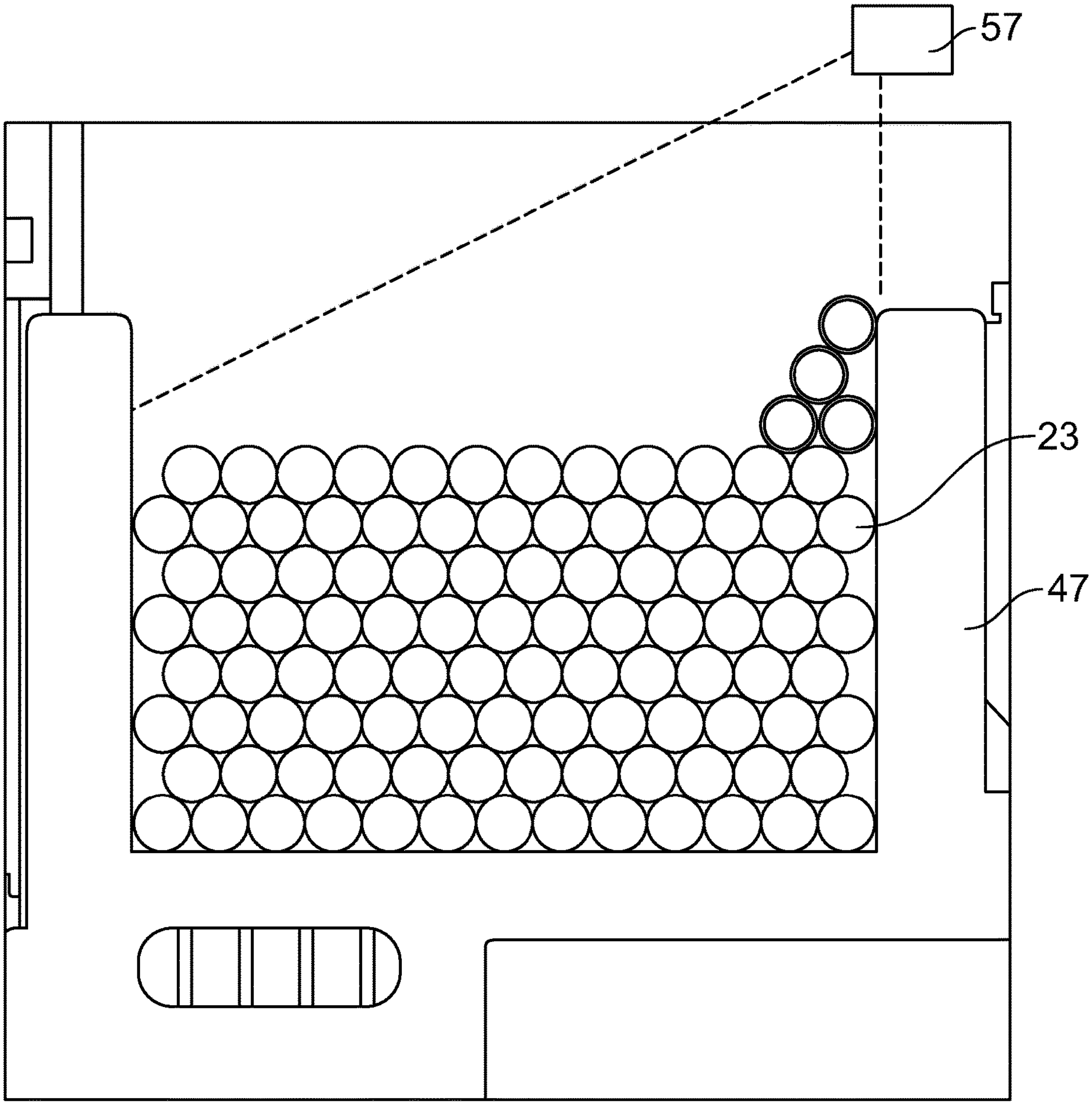
FIG. 4 is a section view of a winch drum including a plurality of cable layers.

FIG. 4 shows one example of a winch drum 47 with layers of load cable 23 positioned on the drum. In the illustrated example, there are eight layers of load cable 23 that are positioned on the drum 47 and extend the full width of the drum. The winch drum 47 includes a drum sensor 57 that is configured to sense cable 23 on the drum. As noted above, the drum sensor 57 may be configured to sense rotation of the drum 47, distance to cable on the drum, or any suitable method of acquiring data indicative of how many layers of cable on the drum.

One example of the change in line speed of the load cable 23 at the hook assembly 22 as a function of the effective diameter (the combined diameter of the drum and cable) is shown below in Table 1 below. The values are based on a drum diameter of 266.7 millimeters (mm) and a cable diameter of 19 mm and assumes that the drum 47 is turned at 60 revolutions per minute (RPM). It should be noted that the cable does not stack in layers equal to the cable diameter (19 mm) because the cable may assume a nested configuration, an example of which is shown in FIG. 4. Thus, the actual change in effective diameter can be calculated by using a suitable trigonometric function.

In one example, given a cable 23 that is 19 mm in diameter laid up as shown in FIG. 4, each layer increases the effective diameter of the cable and drum 34 mm (somewhat less than twice the cable diameter). The table shows that a change in the numbers of layers yields a corresponding change in the effective diameter of the combined drum and cable, which results in a corresponding change to the line speed at, for example, the boom and hook.

TABLE 1

| | Effective Diameter [mm] | Line speed [m/min] | |
|---|---|---|---|
| Layer | SAE J706 | Boom | Hook |
| 1 | 285.7 | 13.5 | 6.7 |
| 2 | 319.9 | 15.1 | 7.5 |
| 3 | 354.1 | 16.7 | 8.3 |
| 4 | 388.3 | 18.3 | 9.1 |
| 5 | 422.5 | 19.9 | 10.0 |
| 6 | 456.7 | 21.5 | 10.8 |
| 7 | 490.9 | 23.1 | 11.6 |
| 8 | 525.1 | 24.7 | 12.4 |
| 9 | 559.3 | 26.4 | 13.2 |
| 10 | 593.5 | 28.0 | 14.0 |

For example, the line speed in the above exemplary table with an effective diameter of 285.7 millimeters (mm), i.e., with one (1) layer of cable on the drum is 6.7 meters per minute (m/min) at the hook assembly, or of the hook itself. When cable is being wound onto the drum and two (2) layers of cable are positioned on the drum, the effective diameter increases to 319.9 mm. As a result, given a constant drum RPM and constant control input from the operator, the speed would increase to 7.5 m/min of the hook assembly. This is because the line speed, wherever it is measured, is a function of the effective diameter.

The increase in effective diameter from one layer at 285.7 mm to two layers at 319.9 mm and the resulting increase in line speed from 6.7 m/min to 7.5 m/min is an increase of about 11.9 percent. To maintain a constant line speed therefore, the drum 47 is controlled, by output control commands 71 generated by the winch controller 51 and sent to the winch motor 42 (or an equivalent winch rotating mechanism) to turn at a lesser rotational speed (about 11.9 percent in this example) such that the line speed is 6.7 m/min at the hook assembly with two layers of cable wound onto the drum 47. A calculation is made by the winch controller 51 and a control command 71 is generated by the winch controller based on a determination of the numbers of layers of cable on the drum in the same manner as illustrated above with respect to a change of one cable layer to two cable layers and in view of the input direction of line/hook movement. Therefore, when the winch controller 51 can determine the number of layers of cable on the winch drum, a calculation can be made to adjust the control command 71 and therefore the rotational speed of the winch drum to maintain a constant line speed, assuming a given, fixed input command from the operator.

Figure 6:
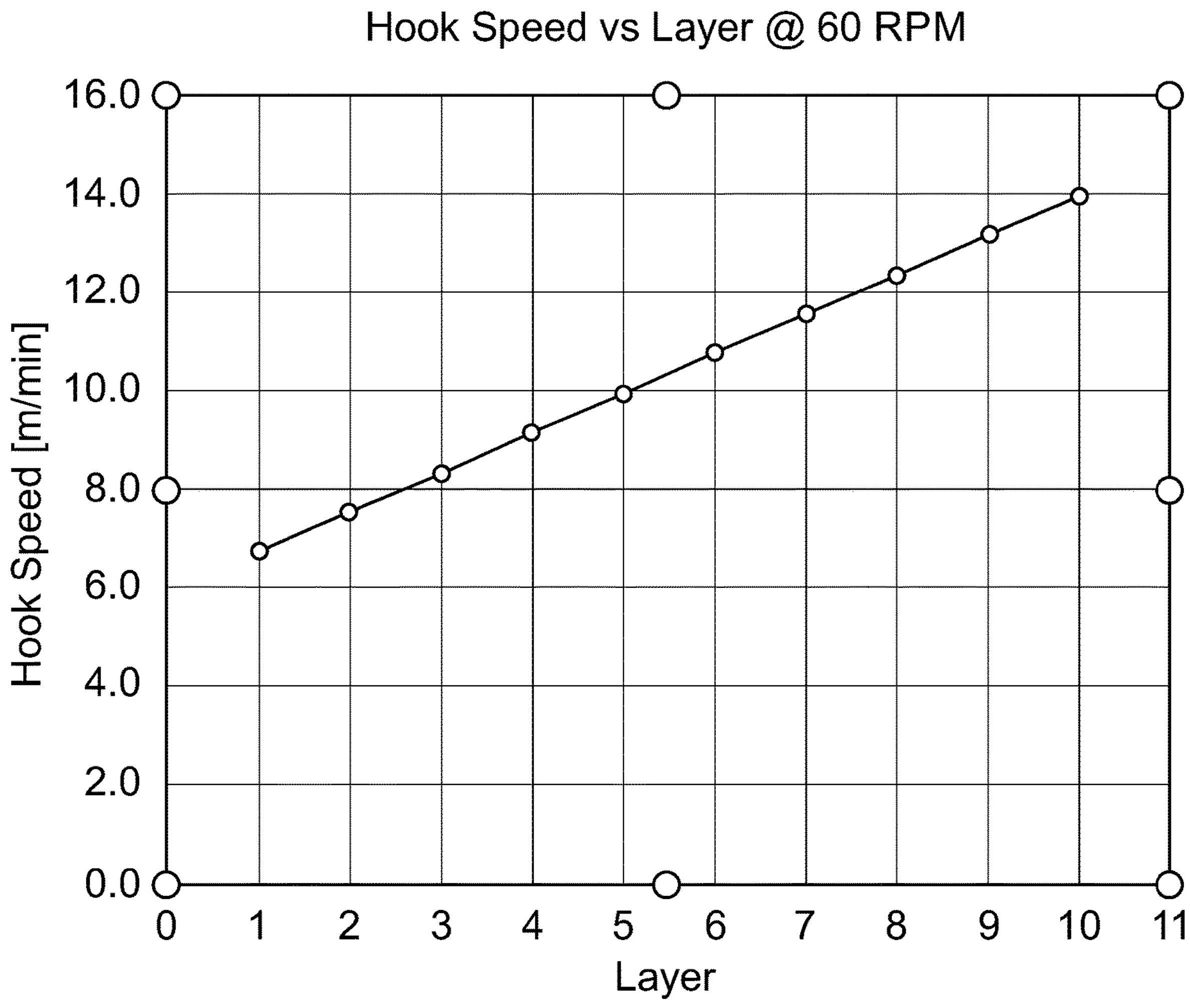
FIG. 6 is a graph of layer vs. line speed.

FIG. 6 is a table that shows the relationship, in one example, between the number of layers and the line speed at the hook 22. In the embodiment given, the cable diameter is 19 mm, the drum diameter is 266.7 mm, the drum width is 355.6 mm, and the drum speed is 60 RPM. In addition, a factor may be introduced to compensate for the tendency of the rope to compress, which will referred to as a "K" factor. Given the above, in one example, the uncorrected line speed at the hook increases during retrieval of rope onto the drum, as a layer is added, by 0.8 m/sec. The controller 51 is configured to generate a control command that corrects for the change in the number of layers to produce a constant or substantially constant line speed independent from the number of layers given an unchanging speed input command.

The relationship may be represented by the following equation, which may be resident in and used by the controller 51 to perform a calculation to determine the amount of correction to be made of the control command required to produce the desired, requested line speed:

$$S = \frac{N\pi dK(2n-1)+D}{1000R}$$

Where S is winch line speed (m/min);
N is winch input speed;
d is rope diameter;
K is rope compensation factor (range is typically 0.7-0.9);
n is rope layer;
D is drum diameter (mm); and
R is winch reduction value.

It will be understood that inputs may be provided for an operator or the like to enter values into the controller as needed to perform the calculation. Alternatively, the values may be predetermined based on a specified configuration of machine and rope and therefore fixed and provided to and stored within the controller to be used in calculating the correction required.

INDUSTRIAL APPLICABILITY

The industrial applicability of the system described herein will be readily appreciated from the forgoing discussion. The foregoing discussion is applicable to machines that employ winches in either a main functionality of the machine or as an auxiliary functionality of the machine. In yet other examples, the present disclosure may be applied to operations employing a winch or winches that benefit from an accurately controlled lifting or lowering task or tasks, even when the task is being conducted by a relatively inexperienced operator.

Figure 5:
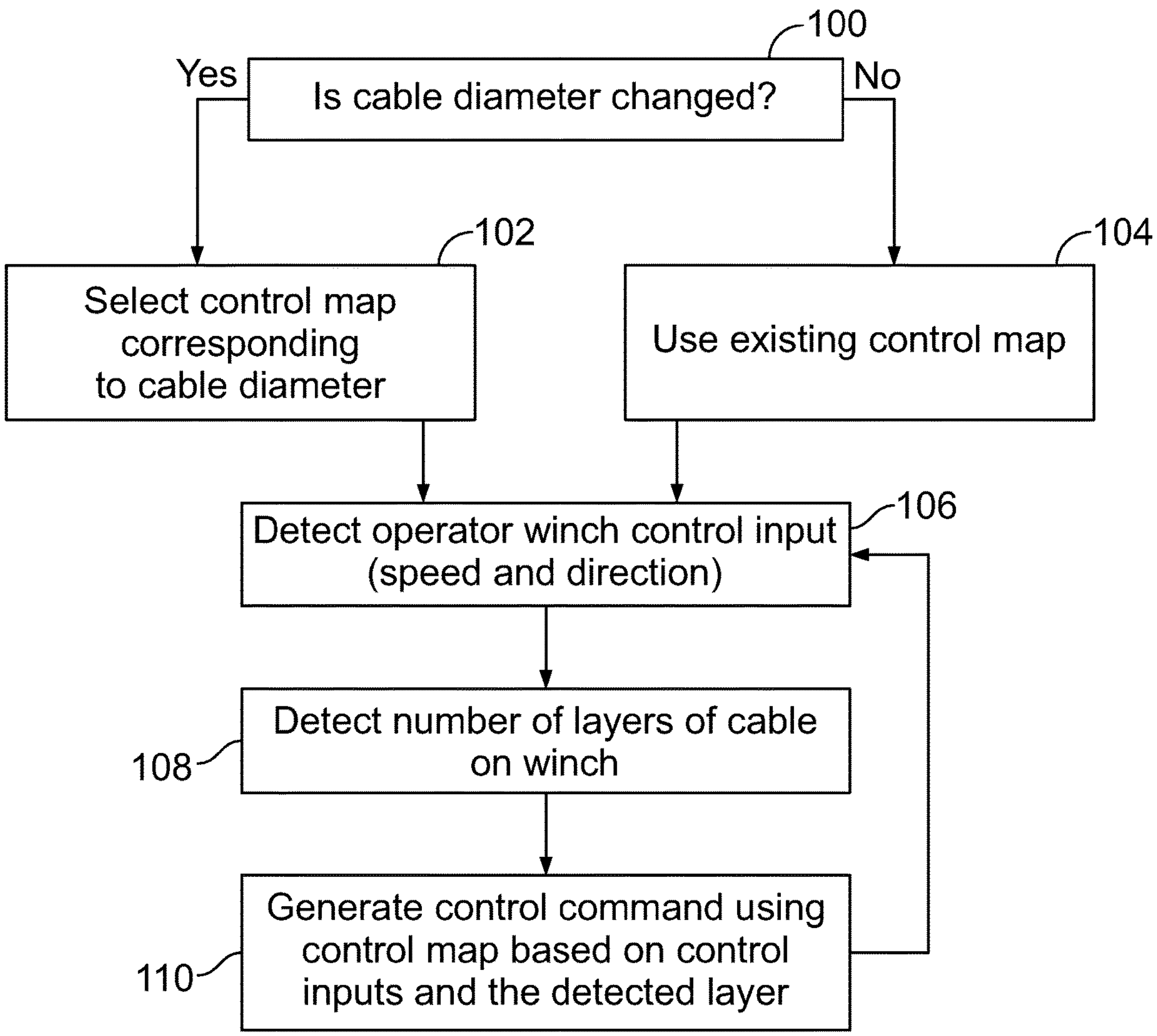
FIG. 5 is a flowchart of a method of operating a winch to compensate for changes in the effective layers of cable.

One example of the industrial applicability according to the disclosure includes a method of operating a machine 10 with a winch system 40 is shown in FIG. 5. Step 100, which is an optional step, and also referring to the previous figures, involves the operator selecting whether the cable diameter is changed from a previous operation of the machine 10. If no, the winch controller 51, in step 104 uses an existing map or database or the like comprising a calculation that employs a selected diameter of winch drum 47, a selected diameter of cable 23, and a predetermined change in diameter based on number of cable layers. If the machine 10 uses only one diameter of cable, this step may be skipped.

If the cable 23 is changed in diameter, a control map is selected in step 102 and employed by the winch controller 51 that uses different variables relating to the diameter of the winch drum 47, a selected diameter of cable 23, and a predetermined change in diameter based on number of cable layers. Once a map has been confirmed or selected and loaded into the winch controller 51, the winch controller is configured to receive input signals from the operator relating to a line speed request and a line direction request in step 106. The winch controller 51 is configured to receive signals from a drum sensor 57 indicative of the number of layers of cable on the drum 47 in step 108. In step 110, control commands 71 are generated using the selected control map based on control inputs from step 106 and the detected layer from 108 to adjust the rotational speed of the drum 47 to maintain a constant line speed when the speed control input from the operator is unchanged. It will be appreciated that in embodiments, the controller 51 may be provided with or will have access to control maps that correspond to a cable diameter designed for or originally specified for the machine 10 and maps that correspond to cables with diameters that are different.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for controlling an operation of a winch assembly, comprising:
- a winch drum configured to rotate;
- a winch cable attached to said winch drum;
- a winch motor operatively connected to said winch drum and configured to rotate said winch drum;
- a sensor operatively associated with said winch drum, said sensor configured to generate signals indicative of a number of layers of said winch cable on said winch drum; and
- a winch controller configured to:
  - receive a control input requesting a selected rotation of said winch drum;
  - receive said signals from said sensor;
  - determine the number of layers of said winch cable that are disposed on said winch drum based on said signals from said sensor; and
  - generate at least one control command to control said winch motor and thereby rotate said winch drum based on at least said control input and said determination of said number of layers of said winch cable,
  - wherein said at least one control command causes said winch drum to rotate so as to produce a substantially constant line speed based on said received control input and independent of the number of layers determined to be disposed on said winch drum.

2. The system of claim 1 wherein the sensor is configured to sense rotation of the winch drum.

3. The system of claim 1 wherein the sensor employs at least one of visual, radar, LIDAR, or acoustic methods of sensing said number of layers.

4. The system of claim 1 wherein said control input includes at least a speed request.

5. The system of claim 4 wherein said control input further includes a direction request.

6. The system of claim 1 wherein said winch motor is one of an electrical motor or a hydraulic motor.

7. A machine, comprising:
- a machine chassis;
- a winch system comprising:
  - a winch drum configured to rotate;
  - a winch motor configured to rotate said winch drum;
  - a winch cable attached to said winch drum;
  - a sensor configured to generate signals indicative of a number of layers of said winch cable on said winch drum; and a hook attached to said winch cable for coupling to a load; and a control system including a controller configured to receive said signals from said sensor, determine the number of layers of said winch cable that are disposed on said winch drum based on said signals, and generate at least one control command to control said winch motor and thereby rotate said winch drum based on at least said determination of said number of layers of said winch cable, wherein said at least one control command causes said winch drum to rotate to produce a substantially constant line speed independent of said number of layers determined to be disposed on said winch drum.

8. The machine of claim 7, further comprising a boom extending from said machine chassis; and wherein said winch system further comprises:

a boom drum configured to rotate; and a boom cable attached to said boom drum so as to raise or lower said boom when said boom drum is rotated.

9. The machine of claim 8 wherein said winch cable is disposed on said boom so as to lift or lower the load when said winch drum is rotated.

10. The machine of claim 7 wherein the sensor is configured to sense rotation of the winch drum.

11. The machine of claim 10 wherein the sensor employs at least one of visual, radar, LIDAR, or acoustic methods of sensing said number of layers.

12. The machine of claim 7 wherein the winch motor is one of an electrical motor or a hydraulic motor.

13. The machine of claim 12 wherein the sensor directly senses rotation of the winch drum.

14. A method of operating a winch system of a machine, comprising:

receiving, with a controller, a control input;

receiving, with the controller, signals indicative of a number of layers of cable on a winch drum of a winch of the winch system;

determining, with the controller, the number of layers of cable on the winch drum based on said receiving of the signals;

generating at least one control command based on at least said receiving of the control input and said determining of the number of layers; and rotating the winch drum based on said control command so as to produce a substantially constant line speed independent of the number of layers determined to be disposed on the winch drum.

15. The method of claim 14 wherein the control input includes a speed request.

16. The method of claim 15 wherein the control input further includes a direction request.

17. The method of claim 14 wherein the signals are generated by a sensor.

18. The method of claim 17 wherein the sensor is one or more of a rotation sensor, a camera, or uses radar, LIDAR, or acoustic methods.

19. The method of claim 14 wherein the at least one control command controls the rotational speed of a winch motor operatively engaged with the winch drum.

20. The method of claim 14 wherein the at least one control command controls the operation of a hydraulic motor.

* * * * *